United States Patent
Haskey et al.

(10) Patent No.: US 9,219,861 B2
(45) Date of Patent: Dec. 22, 2015

(54) ADAPTED DIGITAL DEVICE AND ADAPTER FOR A DIGITAL DEVICE

(75) Inventors: Stephen J. Haskey, Winchester (GB); Wendy-Ann Haskey, Winchester (GB); Lucas W. Partridge, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 13/491,840

(22) Filed: Jun. 8, 2012

(65) Prior Publication Data
US 2012/0314105 A1   Dec. 13, 2012

(30) Foreign Application Priority Data
Jun. 10, 2011   (EP) ..................................... 11169557

(51) Int. Cl.
*H04N 5/232*   (2006.01)
*H04M 1/02*   (2006.01)
*H04N 5/262*   (2006.01)

(52) U.S. Cl.
CPC ......... *H04N 5/23248* (2013.01); *H04M 1/0264* (2013.01); *H04N 5/2628* (2013.01)

(58) Field of Classification Search
CPC .............................. H04N 5/361; H04N 5/3575
USPC ........................................................ 348/241
See application file for complete search history.

(56) References Cited

U.S. PATENT DOCUMENTS

| | | | |
|---|---|---|---|
| 7,778,444 B2 | 8/2010 | Lee et al. | |
| 2008/0225127 A1 | 9/2008 | Ming | |
| 2008/0300010 A1* | 12/2008 | Border et al. | 455/556.1 |
| 2010/0020222 A1 | 1/2010 | Jones et al. | |
| 2010/0214444 A1 | 8/2010 | Teshima et al. | |
| 2011/0081946 A1* | 4/2011 | Singh | 455/556.1 |
| 2011/0090303 A1* | 4/2011 | Wu et al. | 348/14.16 |
| 2011/0199479 A1* | 8/2011 | Waldman | 348/116 |

FOREIGN PATENT DOCUMENTS

| | | |
|---|---|---|
| EP | 2031864 A4 | 3/2009 |
| WO | 2011046710 A1 | 4/2011 |
| WO | 2011078913 A1 | 6/2011 |

OTHER PUBLICATIONS

Jari Hannuksela, Camera Based Motion Estimation and Recognition for Human-Computer Interaction. ACTA Univ Oul C 313, Dec. 19, 2008, p. 63-66, University of Oulu, Oulu Finland.
Wikipedia, "Wikitude", downloaded Aug. 7, 2012, http://en.wikipedia.org/wiki/Wikitude.
Wikipedia, "Angle of view", Wikipedia.org, Jun. 4, 2011,http://en.wikipedia.org/w/index.php?title=Angle_of_view& oldid=432485494.
"Notification of Transmittal of the International Search Report and the Written Opinion of the International Searching Authority, or the Declaration" for PCT/EP2012/059495, mailed Jul. 23, 2012, 13 pages, European Patent Office.

* cited by examiner

*Primary Examiner* — James Hannett
*Assistant Examiner* — Fayez Bhuiyan
(74) *Attorney, Agent, or Firm* — Jordan IP Law, LLC

(57) ABSTRACT

A digital device having an image-handling function, adapted to be held at a level between a user's shoulder level and the user's hip level and directed toward a scene, comprising: a display located on a first surface of the device; an image capture component comprising a lens locatable adjacent a second surface, the lens being adapted to capture a field of view having a center lying on an axis substantially parallel to the first surface; a spatial attitude detector for detecting a current attitude of the device relative to a baseline attitude; a selector for selecting a portion of the field of view according to the baseline attitude; a distortion corrector for correcting distortion of the view caused by an angular difference between the current attitude and the baseline attitude; and a renderer for rendering a corrected image by the distortion corrector on the display.

21 Claims, 4 Drawing Sheets

ADAPTED DIGITAL DEVICE AND ADAPTER FOR A DIGITAL DEVICE

BACKGROUND

Embodiments of the invention relate to the field of portable digital devices and more specifically to multifunction portable digital devices having image-handling functions.

Some mobile devices contain gyroscopes, compasses, GPS capabilities, cameras and image-processing functions that allow them to be used for augmented reality applications. An augmented reality application is one that overlays virtual computer-generated imagery over a real-world image of the environment. In an example, a camera in such a device may be pointed at a building having historical significance. The device may use GPS and other data to identify the building and may then seek historical data relating to the building and display the data as text overlaid on the bottom of the image displayed on the display screen of the device. Augmented reality may thus enrich the user's experience of the view of the building.

Augmented reality applications rely on the user pointing the mobile device's camera at the area of interest, often leveled on a horizon, in order to have useful computer-generated imagery placed on top of the displayed image. Typically mobile devices use the camera at the back of the device (the side opposite to the side bearing the display), thus requiring users to hold the device vertically in front of them, at approximately eye-level. This feels very unnatural and is particularly difficult to do when walking. As many augmented reality applications are intended to operate as guides to scenes through which a user is walking while looking, for example at the architectural features of buildings in a street, this limitation is quite severe.

BRIEF SUMMARY

It may be desirable to alleviate the disadvantages of the known art by providing digital devices with improved imaging functions to make them more amenable to use for, for example, augmented reality applications.

Embodiments of the present invention accordingly provide, in a first aspect, a digital device having an image-handling function and adapted to be held at a level between a user's shoulder level and the user's hip level and directed toward a scene. The digital device may include a display located on a first surface of said device, an image capture component comprising a lens locatable adjacent to a second surface of said device, said lens being adapted to capture a field of view of said scene having a center lying on an axis substantially parallel with respect to said first surface, a spatial attitude detector to detect a current attitude of said device relative to a baseline attitude, a selector to select a portion of said field of view corresponding to a view according to said baseline attitude, a distortion corrector to correct image distortion of said view caused by an angular difference between said current attitude and said baseline attitude, and a renderer to render an image corrected by said distortion corrector on said display.

The digital device may be adapted to be handheld. The digital device may further comprise an augmenter to provide augmented reality data to be displayed on said display, wherein said axis may be substantially parallel to said baseline attitude. The lens may be an asymmetric lens to capture a field of view having a greater dimension of field in a first axis of a plane of said field of view than in a second axis of said plane. Additionally, said greater dimension of said field of view can be, in normal use of said device, a vertical dimension. The selector may also select said portion of said field of view with respect to said greater vertical dimension. The digital device may further comprise an adapter locatable on a digital device having a second lens located on a third surface, the adapter being equipped with light guidance means for conducting the image from the lens locatable adjacent to the second surface to the second lens located on the third surface.

In a second aspect, there is provided a method of operating a digital device having a first surface, a second surface and an image-handling function and adapted to be held at a level between a user's shoulder level and the user's hip level and directed toward a scene. The method may also include capturing a field of view of said scene, by an image capture component comprising a lens locatable adjacent to said second surface of said device, said field of view of said scene having a center lying on an axis substantially parallel with respect to said first surface. The method may also provide for detecting, by a spatial attitude detector, a current attitude of said device relative to a baseline attitude, selecting, by a selector, a portion of said field of view corresponding to a view according to said baseline attitude, correcting, by a distortion corrector, image distortion of said portion of said field of view caused by an angular difference between said current attitude and said baseline attitude, and rendering, by a renderer, an image corrected by said distortion corrector on a display located on said first surface of said device.

The digital device may also be adapted to be handheld. The method may further include providing augmented reality data by an augmenter to be displayed on said display, wherein said axis is substantially parallel to said baseline attitude. The method may further include capturing, by an asymmetric lens, a field of view having a greater dimension of field in a first axis of a plane of said field of view than in a second axis of said plane. The greater dimension of said field of view may be, in normal use of said device, a vertical dimension. The method may further involve the selector selecting said portion of said field of view with respect to said greater vertical dimension. The method may further include providing an adapter locatable on a digital device having a second lens located on a third surface, the adapter being equipped with light guidance means for conducting the image from the lens locatable adjacent to the second surface to the second lens located on the third surface.

In a third aspect, there is provided a computer program product including a computer readable storage medium, and computer usable code stored on the computer readable storage medium. If executed by a processor, the computer usable code may cause a digital device having a first surface to capture a field of view of a scene, by an image capture component including a lens locatable adjacent to a second surface of the device, the field of view of the scene to have a center lying on an axis substantially parallel with respect to the first surface. The computer usable code, if executed, may also cause the digital device to detect a current attitude of the device relative to a baseline attitude, select a portion of the field of view corresponding to a view according to the baseline attitude, correct image distortion of the portion of the field of view caused by an angular difference between the current attitude and the baseline attitude, and render a corrected image on a display located on the first surface of the device.

Embodiments of the present invention may therefore advantageously provide handheld digital devices with improved imaging functions to make them more amenable to use for augmented reality and other applications.

BRIEF DESCRIPTION OF THE DRAWINGS

Embodiment of the present invention will now be described, by way of example only, with reference to the accompanying drawings, in which.

DETAILED DESCRIPTION OF EMBODIMENTS OF THE INVENTION

Embodiments of the present invention may address problems of the known art by allowing the user to hold a multifunction device more naturally while having the view of the area of interest displayed correctly on the device, thus making the device more amenable to use for augmented reality and other applications.

Figure 1A:
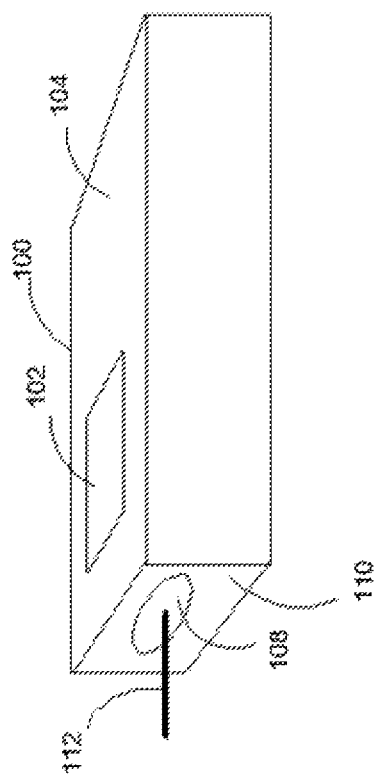
FIG. 1A shows an apparatus according to an embodiment of the present invention.
Figure 1B:
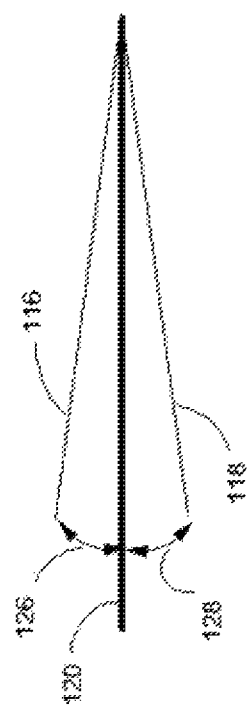
FIG. 1B shows, in simplified form, an attitude detail of an embodiment of the present invention.
Figure 1C:
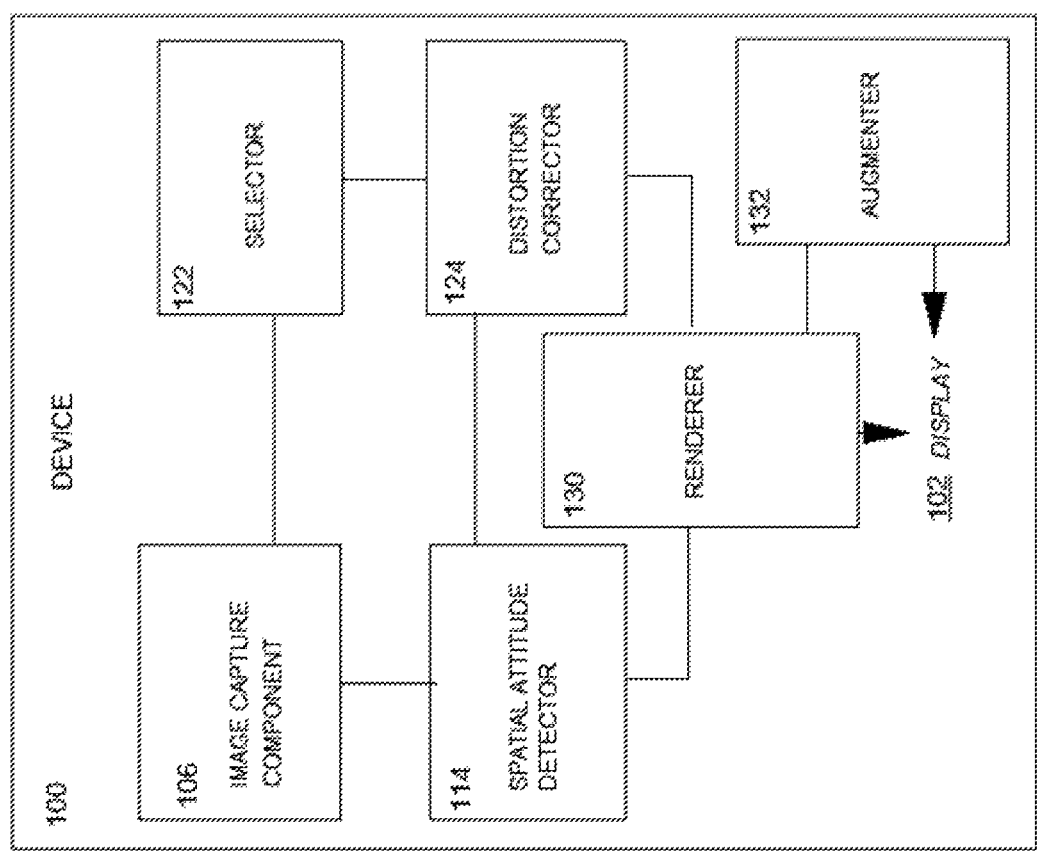
FIG. 1C shows, in simplified schematic form, component details of an embodiment of the present invention.

Turning to FIGS. 1A, 1B and 1C taken together, there is shown a handheld digital device 100 having an image-handling function and adapted to be held at a level between a user's shoulder level and the user's hip level and directed toward a scene. Device 100 comprises a display 102 located on a first surface 104 of the device 100. An image capture component 106 comprises a lens 108 locatable adjacent to a second surface 110 of the device 100, the lens being adapted to capture a field of view of the scene having a center lying on an axis 112 substantially parallel with respect to the first surface 104. The device 100 also comprises a spatial attitude detector 114 to detect a current attitude 116, 118 of the device relative to a baseline attitude 120. The spatial attitude detector 114 may, in one embodiment, be operable to use gyroscopic input information to determine the current attitude 116, 118 of the device relative to a baseline attitude 120. As will be clear to one of skill in the art, the image capturing elements of handheld devices are prone to being "mis-aimed" with respect to the scene of interest because of the margin of error inherent in the human operator's physical control. Thus, the current attitude 116, 118 of the device relative to the baseline attitude 120 may exhibit considerable variation from the ideal with respect to aiming. The device 100 is thus additionally equipped with a selector 122 to select a portion of the field of view corresponding to a view according to the baseline attitude 120—that is, to a substantially perfectly-aimed view of the scene of interest. However, when this is done, the view as selected will typically exhibit some distortion, caused by the discrepancy between the baseline attitude 120 and the current attitude 116, 118 of the device.

The device 100 is therefore further provided with a distortion corrector 124 for correcting image distortion of the portion of the field of view caused by an angular difference 126, 128 between the current attitude 116, 118 and the baseline attitude 120. The corrected image output by distortion corrector 124 may then be augmented with augmented reality data by an augmenter 132. The image output from the distortion corrector 124, with optional augmented reality data, is then passed to a renderer 130 for rendering on the display 102.

As will be clear to one of ordinary skill in the art, the illustrated device 100 is thus made more amenable to use for augmented reality and other applications, without the discomfort and inconvenience caused by the need to hold the device at or near eye-level. In the preferred embodiment of the present invention, a user can carry the device in an approximately level position between, for example, waist and shoulder height, directing the end-mounted camera lens 108 at the scene of interest while having a clear view of the display 102 screen by glancing in a slightly downward direction. This makes it possible to walk about in safety, maintaining awareness of surroundings, while having the advantage of viewing the augmented reality on the display 102. The near-inevitable slight tilting of the device 100 relative to the scene of interest is compensated by the distortion corrector 124.

The lens located at the end of the device may, in one possible embodiment, be a specialist lens operable to capture a vertically long, yet narrow in width, view of the environment. The width of the image captured by the device is sufficient to be fully displayed on the device's display. In an exemplary embodiment, the height of the captured image may thus be larger than the height that is possible to accommodate on the display screen, with the image containing a view of the environment many degrees (maybe around 45) above and/or below the notional image horizon.

Using the device's gyroscope, in one exemplary embodiment, to determine the current attitude 116, 118 of the device 100 relative to a baseline attitude 120, a selection of the captured image is displayed on the display 102, thereby ensuring that the point of interest, for example the horizon, is always displayed in the center of the display 102 screen regardless of how the user is holding the device 100 (within limitations of the captured image).

The camera on the mobile device may capture a live image of the environment. Only a selected portion of the image is displayed on the mobile device's display, depending on the angle at which the device is held. If the angle of the device with respect to the baseline, for example to the horizontal, decreases then a higher part of the captured image appears on the device's display. If the angle to the horizontal increases then a lower part of the captured image appears on the device's display. In each case, the image is adjusted for distortion with respect to the view as seen at the baseline. This means that regardless of the angle at which the device is held, within the limits of the lens, the vertical aspect of the image on the device remains the same. Moving the device from side to side makes the image move from side to side as normal, for example if the user was scanning the real-world horizon.

Embodiments of the present invention are thus applicable to enable a user to hold the device in a comfortable position while viewing an undistorted image of the scene of interest, the image being suitable for the addition of augmented reality information.

It will be clear to one of ordinary skill in the art that at least part of the method of the preferred embodiments of the present invention may suitably and usefully be embodied in a logic apparatus, or a plurality of logic apparatuses, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Figure 2:
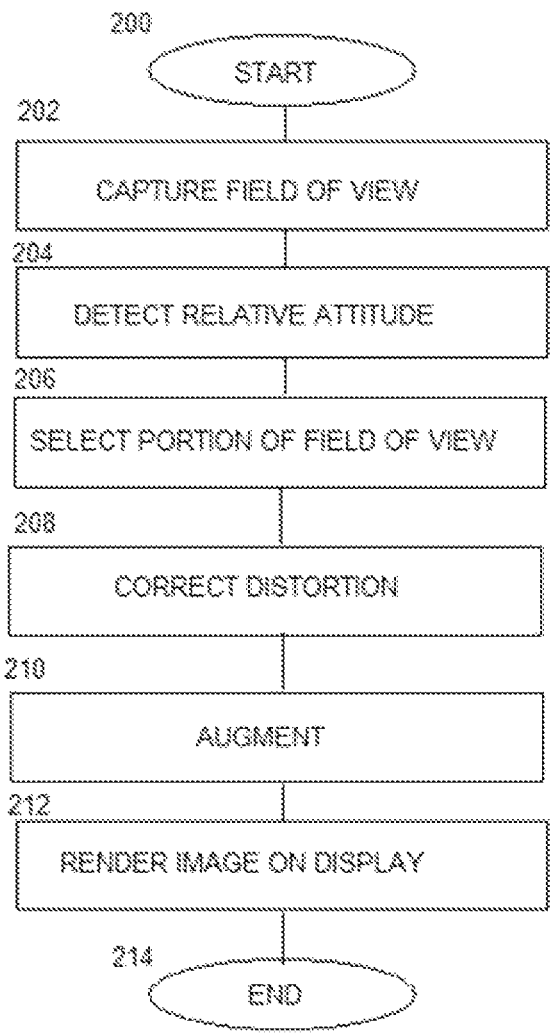
FIG. 2 shows, in flowchart form, a method of operation of an apparatus according to an embodiment of the present invention.

Turning to FIG. 2, there is shown in flowchart form, a method of operation of an apparatus according to an embodiment of the present invention. FIG. 2 should be read with an understanding of the description of FIGS. 1A, B and C.

More specifically, in FIG. 2 is shown a method of operating a handheld multifunction digital device 100 having an image-handling function and a first surface 104 and a second surface 110. The device 100 may be adapted to be held at a level between a user's shoulder level and the user's hip level and directed toward a scene.

The method of operating the device 100 comprises, following START step 200, capturing 202 a field of view of the scene, by image capture component 106 comprising a lens 108 locatable on the second surface 110 of the device, the field of view of the scene having a center lying on an axis 112 substantially parallel with respect to the first surface. A special attitude detector detects 204 a current attitude of the device relative to a baseline attitude. A selector then selects 206 a portion of the field of view corresponding to a view according to the baseline attitude. Distortion corrector 124 corrects at step 208 any image distortion of the portion of the field of view caused by an angular difference between the current attitude and the baseline attitude. The corrected image may then be augmented with augmented reality data at optional step 210. Renderer 130 then renders, at step 212, an image corrected by distortion corrector 124 on a display 102 located on the first surface 104 of device 100.

A method may be generally conceived to be a self-consistent sequence of steps leading to a desired result. These may steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

Embodiments of the present invention may further suitably be partially embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Figure 3:
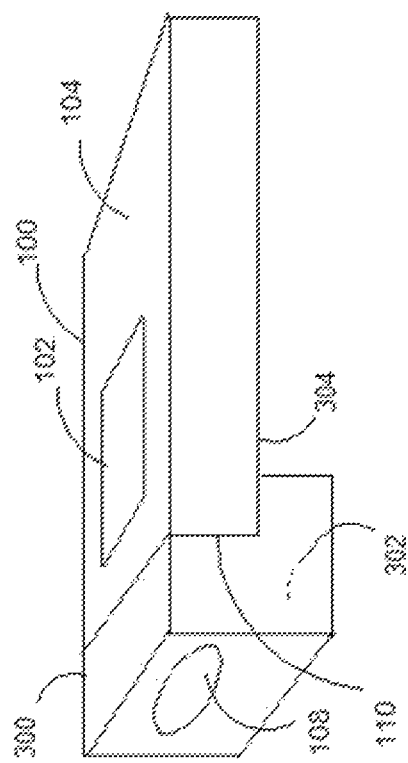
FIG. 3 shows an apparatus according to one alternative embodiment of the present invention.

In one alternative, shown in FIG. 3, an embodiment of the present invention may be realized in the form of an adapter 300 locatable on a digital device 100 already having a built-in second lens located on a third surface 304, the adapter 300 being equipped with a light guidance means 302 for conducting the image from the lens 108 locatable adjacent to the second surface 110 to the second lens located on a third surface 304. In this way, an exemplary conventional handheld device such a camera phone, having its built-in lens located on the surface opposed to the display surface, may be conveniently adapted to function according to the preferred embodiment of the present invention. It will be abundantly clear to one of ordinary skill in the art that light guidance means may comprise any suitable arrangement of, for example, lenses, prisms and optical fibers that can conduct light from lens 108 locatable adjacent to the second surface 110 to the second lens located on a third surface 304.

It will be clear to one skilled in the art that many improvements and modifications can be made to the foregoing exemplary embodiment without departing from the scope of the present invention.

We claim:

1. A digital device having an image-handling function and adapted to be held at a level between a user's shoulder level and the user's hip level and directed toward a scene, comprising:
   a display located on a first surface of said device;
   an image capture component comprising a lens locatable adjacent to a second surface of said device, said lens being adapted to capture a field of view of said scene having a center lying on an axis substantially parallel with respect to said first surface;
   a spatial attitude detector to detect a current attitude of said device relative to a baseline attitude;
   a selector to select a portion of said field of view that is centered on said baseline attitude;
   a distortion corrector to correct image distortion of said view caused by an angular difference between said current attitude and said baseline attitude;
   a renderer to render an image corrected by said distortion corrector on said display; and
   an adapter locatable on the digital device, the adapter having a second lens located on a third surface, the adapter being equipped with light guidance means for conducting the image from the lens locatable adjacent to the second surface to the second lens located on the third surface.

2. The digital device of claim 1, wherein the digital device is adapted to be handheld.

3. The digital device of claim 1, further comprising an augmenter to provide augmented reality data to be displayed on said display.

4. The digital device of claim 1, wherein said axis is substantially parallel to said baseline attitude.

5. The digital device of claim 1, wherein said lens is an asymmetric lens to capture a field of view having a greater dimension of field in a first axis of a plane of said field of view than in a second axis of said plane.

6. The digital device of claim 5, wherein said greater dimension of said field of view is, in normal use of said device, a vertical dimension.

7. The digital device of claim 6, wherein said selector selects said portion of said field of view with respect to said greater vertical dimension.

8. A method of operating a digital device having a first surface, a second surface and an image-handling function and adapted to be held at a level between a user's shoulder level and the user's hip level and directed toward a scene, comprising:

capturing a field of view of said scene, by an image capture component comprising a lens locatable adjacent to said second surface of said device, said field of view of said scene having a center lying on an axis substantially parallel with respect to said first surface;

detecting, by a spatial attitude detector, a current attitude of said device relative to a baseline attitude;

selecting, by a selector, a portion of said field of view that is centered on said baseline attitude;

correcting, by a distortion corrector, image distortion of said portion of said field of view caused by an angular difference between said current attitude and said baseline attitude;

rendering, by a renderer, an image corrected by said distortion corrector on a display located on said first surface of said device; and providing an adapter locatable on the digital device, the adapter having a second lens located on a third surface, the adapter being equipped with light guidance means for conducting the image from the lens locatable adjacent to the second surface to the second lens located on the third surface.

9. The method of claim 8, wherein the digital device is adapted to be handheld.

10. The method of claim 8, further comprising providing augmented reality data by an augmenter to be displayed on said display.

11. The method of claim 8, wherein said axis is substantially parallel to said baseline attitude.

12. The method of claim 8, further comprising capturing, by an asymmetric lens, a field of view having a greater dimension of field in a first axis of a plane of said field of view than in a second axis of said plane.

13. The method of claim 12, wherein said greater dimension of said field of view is, in normal use of said device, a vertical dimension.

14. The method of claim 13, wherein said selector selects said portion of said field of view with respect to said greater vertical dimension.

15. A computer program product comprising:

a non-transitory computer readable storage medium; and computer usable code stored on the non-transitory computer readable storage medium, where, if executed by a processor, the computer usable code causes a digital device having a first surface to:

capture a field of view of a scene, by an image capture component including a lens locatable adjacent to a second surface of the device, the field of view of the scene to have a center lying on an axis substantially parallel with respect to the first surface;

detect a current attitude of the device relative to a baseline attitude;

select a portion of the field of view corresponding to a view that is centered on the baseline attitude;

correct image distortion of the portion of the field of view caused by an angular difference between the current attitude and the baseline attitude;

render a corrected image on a display located on the first surface of the device; and use an adapter to capture the field of view, the adapter locatable on the digital device, the adapter having a second lens located on a third surface, the adapter to be equipped with light guidance means for conducting the image from the lens locatable adjacent to the second surface to the second lens located on the third surface.

16. The computer program product of claim 15, wherein the digital device is to be adapted to be handheld.

17. The computer program product of claim 15, wherein the computer usable code, if executed, causes the device to provide augmented reality data to be displayed on the display.

18. The computer program product of claim 15, wherein the axis is substantially parallel to the baseline attitude.

19. The computer program product of claim 15, wherein the computer usable code, if executed, causes the device to capture, by an asymmetric lens, a field of view having a greater dimension of field in a first axis of a plane of the field of view than in a second axis of the plane.

20. The computer program product of claim 19, wherein the greater dimension of the field of view is, in normal use of the device, a vertical dimension.

21. The computer program product of claim 20, wherein the computer usable code, if executed, causes the device to select the portion of the field of view with respect to the greater vertical dimension.

\* \* \* \* \*